United States Patent
Tamura et al.

(10) Patent No.: US 11,423,874 B2
(45) Date of Patent: Aug. 23, 2022

(54) SPEECH SYNTHESIS STATISTICAL MODEL TRAINING DEVICE, SPEECH SYNTHESIS STATISTICAL MODEL TRAINING METHOD, AND COMPUTER PROGRAM PRODUCT

(71) Applicant: KABUSHIKI KAISHA TOSHIBA, Tokyo (JP)

(72) Inventors: Masatsune Tamura, Kanagawa (JP); Masahiro Morita, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 76 days.

(21) Appl. No.: 16/941,826

(22) Filed: Jul. 29, 2020

(65) Prior Publication Data
US 2020/0357381 A1 Nov. 12, 2020

Related U.S. Application Data

(60) Division of application No. 15/896,774, filed on Feb. 14, 2018, now Pat. No. 10,878,801, which is a (Continued)

(51) Int. Cl.
*G10L 13/033* (2013.01)
*G10L 13/10* (2013.01)
*G10L 15/14* (2006.01)

(52) U.S. Cl.
CPC .......... *G10L 13/0335* (2013.01); *G10L 13/10* (2013.01); *G10L 15/148* (2013.01); *G10L 2013/105* (2013.01)

(58) Field of Classification Search
CPC .... G10L 13/0335; G10L 13/10; G10L 15/148
(Continued)

(56) References Cited

U.S. PATENT DOCUMENTS

| 4,720,865 A | 1/1988 | Taguchi |
| 5,617,507 A | 4/1997 | Lee |

(Continued)

FOREIGN PATENT DOCUMENTS

| CN | 102592594 A | 7/2012 |
| JP | 2002-268660 A | 9/2002 |

(Continued)

OTHER PUBLICATIONS

Notice of Allowance on U.S. Appl. No. 15/896,774 dated Aug. 31, 2020.

(Continued)

*Primary Examiner* — Susan I McFadden
(74) *Attorney, Agent, or Firm* — Foley & Lardner LLP

(57) ABSTRACT

A speech synthesis model training device includes one or more hardware processors configured to perform the following. Storing, in a speech corpus storing unit, speech data, and pitch mark information and context information of the speech data. From the speech data, analyzing acoustic feature parameters at each pitch mark timing in pitch mark information. From the acoustic feature parameters analyzed, training a statistical model which has a plurality of states and which includes an output distribution of acoustic feature parameters including pitch feature parameters and a duration distribution based on timing parameters.

7 Claims, 11 Drawing Sheets

Related U.S. Application Data continuation of application No. PCT/JP2015/076269, filed on Sep. 16, 2015.

(58) Field of Classification Search
  USPC .......................................................... 704/266
  See application file for complete search history.

(56) References Cited

U.S. PATENT DOCUMENTS

| | | | |
|---|---|---|---|
| 6,505,152 | B1 | 1/2003 | Acero |
| 7,035,791 | B2 * | 4/2006 | Chazan ................. G10L 13/07 704/205 |
| 7,039,588 | B2 | 5/2006 | Okutani |
| 7,580,839 | B2 | 8/2009 | Tamura et al. |
| 8,010,362 | B2 | 8/2011 | Tamura et al. |
| 8,781,835 | B2 * | 7/2014 | Nurminen ............... G10L 13/02 704/266 |
| 9,058,807 | B2 | 6/2015 | Tamura et al. |
| 9,110,887 | B2 | 8/2015 | Ohtani et al. |
| 9,286,886 | B2 * | 3/2016 | Minnis ................... G10L 13/10 |
| 9,754,603 | B2 | 9/2017 | Nakamura et al. |
| 9,830,904 | B2 * | 11/2017 | Nasu ...................... G10L 13/06 |
| 9,972,304 | B2 * | 5/2018 | Paulik .................... G10L 15/30 |
| 10,475,438 | B1 * | 11/2019 | Chicote ................ G10L 13/047 |
| 10,878,801 | B2 * | 12/2020 | Tamura ................. G10L 15/148 |
| 2006/0178873 | A1 | 8/2006 | Gigi |
| 2007/0271099 | A1 | 11/2007 | Kagoshima |
| 2008/0243508 | A1 | 10/2008 | Masuko |
| 2009/0144053 | A1 | 6/2009 | Tamura |
| 2012/0265534 | A1 | 10/2012 | Coorman |
| 2013/0117026 | A1 | 5/2013 | Kato |
| 2013/0218568 | A1 | 8/2013 | Tamura |
| 2015/0199956 | A1 | 7/2015 | Tan |
| 2017/0162186 | A1 | 6/2017 | Tamura et al. |
| 2018/0174570 | A1 | 6/2018 | Tamura |

FOREIGN PATENT DOCUMENTS

| | | |
|---|---|---|
| JP | 2007-193139 A | 8/2007 |
| JP | 2007-233181 A | 9/2007 |
| JP | 2008-203543 A | 9/2008 |
| JP | 2012-048154 A | 3/2012 |
| JP | 5085700 B2 | 11/2012 |
| JP | 2013-164572 A | 8/2013 |
| JP | 2013-205697 A | 10/2013 |
| WO | WO-2016/042659 A1 | 3/2016 |

OTHER PUBLICATIONS

Zen et al., "A Hidden Semi-Markov Model-Based Speech Synthesis System", IEICE Trans. Inf. Syst., vol. E90-D, No. 5, May 2007, pp. 825-834.

Masuko, Takashi, et al. "Speech synthesis using HMMs with dynamic features." 1996 IEEE international conference on acoustics, speech, and signal processing conference proceedings. vol. 1. IEEE, May 1996, pp. 389-392. (Year: 1996).

Moulines, Eric, and Francis Charpentier. "Pitch-synchronous waveform processing techniques for text-to-speech synthesis using diphones." Speech communication 9.5-6, Dec. 1990, pp. 453-467. (Year: 1990).

Narendra, N. P., and K. Sreenivasa Rao. "Optimal residual frame based source modeling for HMM-based speech synthesis." 2015 Eighth International Conference on Advances in Pattern Recognition (ICAPR). IEEE, Jan. 2015, pp. 1-5. (Year: 2015).

Plumpe, Mike, et al. "HMM-based smoothing for concatenative speech synthesis." Fifth International Conference on Spoken Language Processing, Dec. 1998, pp. 1-4. (Year: 1998).

Yoshimura, et al. "Speaker interpolation for HMM-based speech synthesis system." Acoustical Science and Technology 21.4, Apr. 2000, pp. 199-206. (Year: 2000).

* cited by examiner

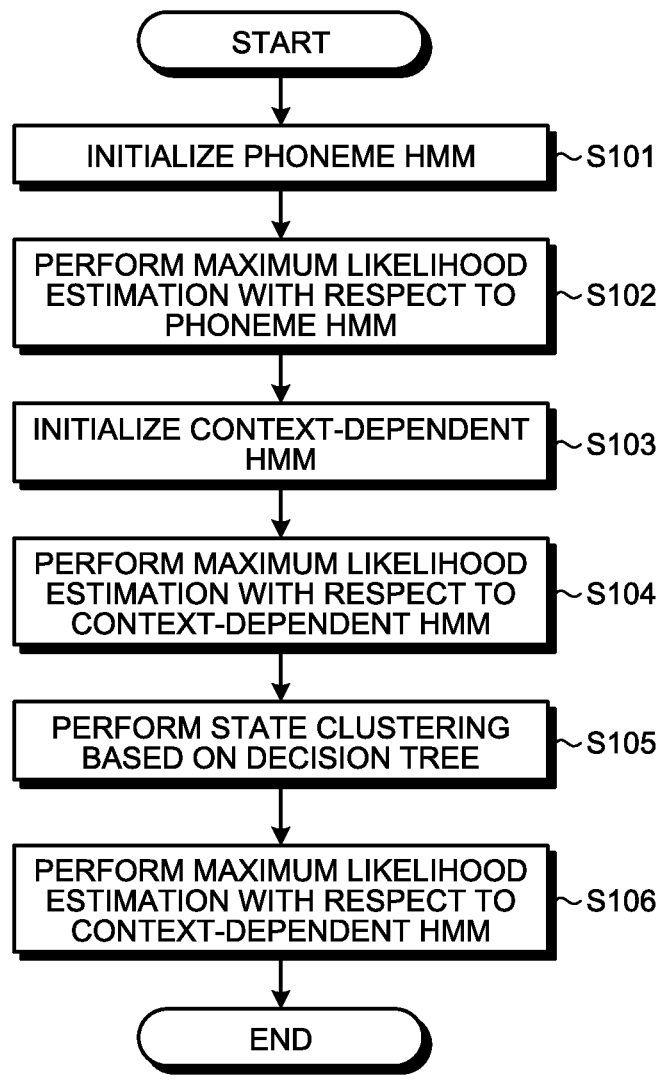

SPEECH SYNTHESIS STATISTICAL MODEL TRAINING DEVICE, SPEECH SYNTHESIS STATISTICAL MODEL TRAINING METHOD, AND COMPUTER PROGRAM PRODUCT

CROSS-REFERENCE TO RELATED APPLICATIONS

This application is a divisional of U.S. application Ser. No. 15/896,774 filed on Feb. 14, 2018, which is a continuation of PCT international application Ser. No. PCT/JP2015/076269 filed on Sep. 16, 2015; the entire contents of which are incorporated herein by reference.

FIELD

The present invention relates to a speech synthesis device, a speech synthesis method, a speech synthesis model training device, a speech synthesis model training method, and a computer program product.

BACKGROUND

A speech synthesis technology is known for converting an arbitrary text into a synthesized waveform. Moreover, a speech synthesis model training device is widely known that trains a statistical model from feature parameters which are obtained by analyzing the database of synthesized waveforms, and a speech synthesis device is widely known that uses the trained statistical model in speech synthesis.

Conventionally, when acoustic feature parameters that are based on speech analysis performed at a fixed frame rate are used, a precise speech analysis is not carried out thereby leading to deterioration in the acoustic quality. Moreover, when speech analysis is performed according to pitch synchronous analysis, a mismatch in the pitch at the time of training and the pitch at the time of synthesis leads to an unnatural phoneme duration. The object of the present invention is to provide a speech synthesis device, a speech synthesis method, a speech synthesis model training device, a speech synthesis model training method, and a computer program product that enable achieving prevention of speech deterioration and prevention of an unnatural phoneme duration.

BRIEF DESCRIPTION OF DRAWINGS

FIG. 6 is a flowchart for explaining the operations performed by an HMM training unit.

DETAILED DESCRIPTION

Figure 1:
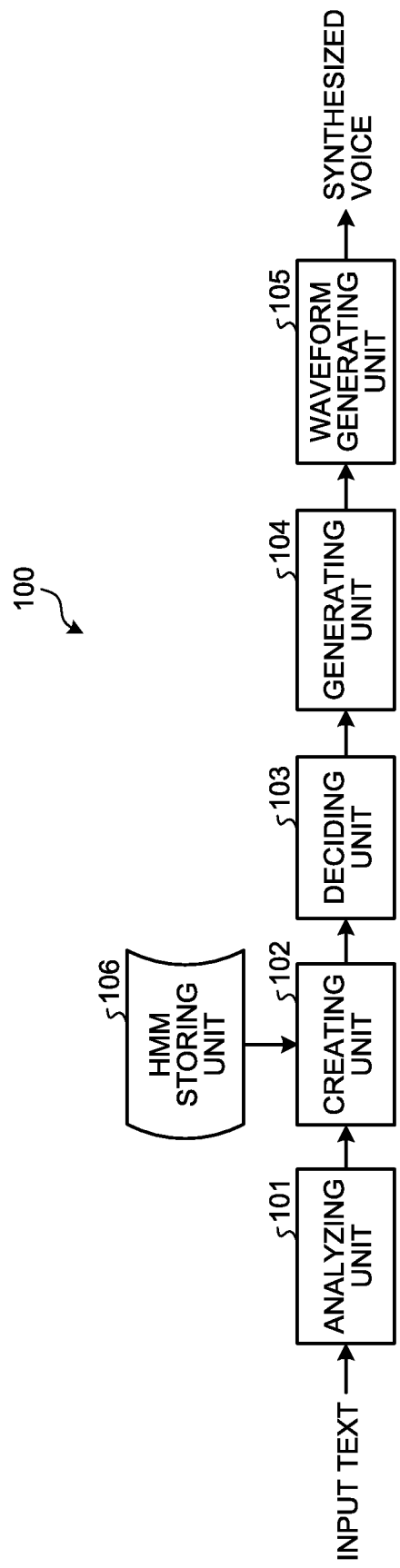
FIG. 1 is a block diagram illustrating a speech synthesis device according to an embodiment.

A speech synthesis device of an embodiment includes a memory unit, a creating unit, a deciding unit, a generating unit and a waveform generating unit. The memory unit stores, as statistical model information of a statistical model, an output distribution of acoustic feature parameters including pitch feature parameters and a duration distribution. The creating unit creates a statistical model sequence from context information and the statistical model information. The deciding unit decides a pitch-cycle waveform count of each state using a duration based on the duration distribution of each state of each statistical model in the statistical model sequence, and pitch information based on the output distribution of the pitch feature parameters. The generating unit generates an output distribution sequence based on the pitch-cycle waveform count, and acoustic feature parameters based on the output distribution sequence. The waveform generating unit generates a speech waveform from the generated acoustic feature parameters.

Firstly, the explanation is given about the background which led to the present invention. Among speech synthesis model training devices, there are some speech synthesis model training devices that train the HMM (Hidden Markov Model), which is a statistical model having a plurality of states, in order to be able to model time-series signals. Moreover, among speech synthesis devices, there are some speech synthesis devices that perform speech synthesis based on the trained HMM.

In the HMM-based speech synthesis, a distribution sequence is obtained according to the input text, and the speech is synthesized by generating feature parameters from the distribution sequence. For example, using the spectral information of the speech and using acoustic feature parameters and prosody feature parameters of the speech, a model can be trained from a feature parameter sequence having a combination of static feature parameters and dynamic feature parameters, which express the time variation; and a parameter generation algorithm that maximizes the likelihood of the static feature parameters and the dynamic feature parameters can be applied to generate a speech based on a smooth feature parameter sequence. The acoustic feature parameters represent the spectrum information and excitation information. The prosody feature parameters represent the pitch information and duration information that is the prosody information of the speech.

Moreover, by applying the speaker adaptation technology/speaker interpolation technology of the HMM, it becomes possible to expand the diverseness of speech synthesis, such as creating a new speaker model or a speaker interpolation model based on a small amount of data or creating an emotion model in which the emotion degrees are controllable.

In the HMM speech synthesis, the commonly-used methods include using the Mel-Cepstrum analysis method and using a spectral envelope extraction method based on STRAIGHT analysis. In these methods, at the time of performing spectral analysis, speech analysis is performed at a fixed frame rate of, for example, 5 ms and feature parameters are analyzed.

In the case of using the Mel-Cepstrum analysis, the association between the center of the frame and the periodicity of the waveform is not taken into account, and parameter analysis is performed by clipping a frame including a plurality of periods and having a relatively wide window width. As a result, the speech that has been subjected to analysis and re-synthesis gets distorted with respect to the original speech waveform, thereby leading to deterioration in the acoustic quality.

In an identical manner, the STRAIGHT analysis too includes speech analysis at a fixed frame rate. In the STRAIGHT analysis, based on time direction smoothing and frequency direction smoothing, spectral analysis is performed while correcting the association between the center of the analysis window and the periodicity. As a result, although the deterioration in the acoustic quality gets reduced, there still occurs some deterioration in the acoustic quality attributed to the analysis at a fixed frame rate, such as deterioration in the acoustic quality at unsteady positions such as boundaries between plosive sounds or voiceless fricatives and voiced sounds.

Meanwhile, as an extension of the HMM-based speech analysis, there are methods such as a hybrid speech analysis method in which speech analysis based on a statistical model and speech analysis based on speech segment selection are combined; a speech analysis method in which feature parameters are selected; and a speech analysis method in which a neural network is used. However, in these methods too, in the case of using a speech analysis method using the Mel-Cepstrum analysis or the STRAIGHT analysis, the issue of having a unnatural acoustic quality arises in the same way.

In the case of implementing the speech analysis method based on a fixed frame rate, the frame count that represents the number of feature parameters has a linear relationship with the duration. Hence, the frame count can be used in the duration distribution. That is, with the frame count in each HMM state directly serving as a parameter of the duration distribution, it becomes possible to perform speech synthesis by training the parameters of the hidden Semi-Markov model (HSMM).

The HSMM is a probabilistic model which is based on the output distribution and the state duration distribution, and in which likelihood calculation is performed using the state duration distribution instead of using a fixed self-transition probability as in the likelihood calculation in the HMM. In that case, a duration model trains the parameters of the duration distribution based on the state occupancy probability, in which each set of speech data is statistically associated to a state, and based on the frame count of the feature parameters associated to each state in the state sequence. Since the duration is obtained by multiplying the frame rate to the frame count, when speech analysis based on a fixed frame rate is performed, the duration distribution having a linear relationship with the duration becomes trainable from only the feature parameters and the corresponding context.

At the time of generating the parameters, the duration distribution obtained by tracing a decision tree directly serves as the distribution of frame counts. Hence, the frame count can be set from the duration distribution parameters; a distribution sequence can be generated according to the frame count in each state; and a parameter generation operation and a waveform generation operation can be performed. In this way, in the case of performing speech analysis based on a fixed frame rate, although there is a deterioration in the acoustic quality, the frame count of the feature parameters can be modeled as the duration distribution, and the frame count at the time of speech analysis can be set directly from the parameters of the duration distribution.

On the other hand, as one of the methods for speech analysis, it is also possible to use pitch synchronous analysis. In the pitch synchronous analysis, instead of performing analysis at a fixed frame rate, the feature parameters are analyzed at an interval corresponding to each pitch period of the speech waveform. For example, pitch mark information is created that represents the central timing of each period of a periodic waveform of the speech; the analysis center is set according to the pitch mark position; a pitch waveform is clipped by applying a window function of the pitch-dependent window width; and the clipped pitch waveform is analyzed so as to obtain the acoustic feature parameters.

Herein, as a result of performing the analysis with the properly-assigned pitch mark position serving as the analysis central timing, it becomes possible to perform a proper analysis that can represent also to the local changes in the speech waveform. Hence, it becomes possible to increase the coincidence of the analyzed-synthesized speech with the original speech, and thus the deterioration in the acoustic quality gets reduced. However, in this case, since the interval of the frames becomes non-constant, the pitch-cycle waveform count representing the frame count no more has a linear relationship with the information about the timing, and the analysis yields a result indicating an increase in the frame count at the positions of high pitch and indicating a decrease in the frame count at the positions of low pitch.

In this way, when the pitch synchronous analysis is performed, if the number of speech frames is used as a parameter of the duration distribution in model training and synthesis, a mismatch in the pitch at the time of training and the pitch at the time of synthesis results in a synthesized speech having an unnatural length. In a duration model, there is a high correlation between the mora (rhythm) and the phonemes. Hence, instead of using the distribution of pitch-cycle waveform counts of the pitch synchronous analysis that changes depending on the pitch, it is desirable to model the parameters having a linear relationship with the timings by the method in which the duration based on the timing parameters attributed to the difference between the start timing and the end timing are treated as the parameters.

Explained below with reference to the accompanying drawings is the speech synthesis device according to an embodiment. FIG. 1 is a block diagram illustrating the speech synthesis device (a speech synthesis device 100) according to the embodiment. As illustrated in FIG. 1, the speech synthesis device 100 includes an analyzing unit 101, a creating unit 102, a deciding unit 103, a generating unit 104, a waveform generating unit 105, and an HMM storing unit 106.

The analyzing unit 101 performs morphological analysis with respect to the input text, obtains language information such as pronounciation information and accent information required in speech analysis, and creates context information from the language information. Alternatively, the analyzing unit 101 can receive already-corrected reading information and accent information corresponding to a separately-created input text, and can create context information.

The context information is used as the unit for classifying the speech such as phonemes/semi-phonemes/syllable HMM. In the case of using the phonemes as speech units, a sequence of phoneme names can be used as the context information. Moreover, the context information can contain the following linguistic attribute information: a triphone having a preceding phoneme/a subsequent phoneme attached thereto; phoneme information containing two preceding phonemes and two subsequent phonemes; phoneme type information indicating attributes of phoneme types classified and elaborated based on voiced sounds/voiceless sounds; the position of each phoneme in the sentence/breath group/accent phrase; the mora count/accent type, the mora position, and the position up to the accent nucleus of an accent phrase; information indicating presence or absence of raised ending; and assigned symbolic information.

The creating unit 102 refers to an HMM (explained later with reference to FIG. 3) stored in the HMM storing unit 106 and, according to the context information input from the analyzing unit 101, creates an HMM sequence corresponding to the input text. The HMM is a statistical model expressed by the state transition probability and by the output distribution of each state. More particularly, the creating unit 102 creates a statistical model sequence from the context information corresponding to the input text and from statistical model information described later.

Figure 2:
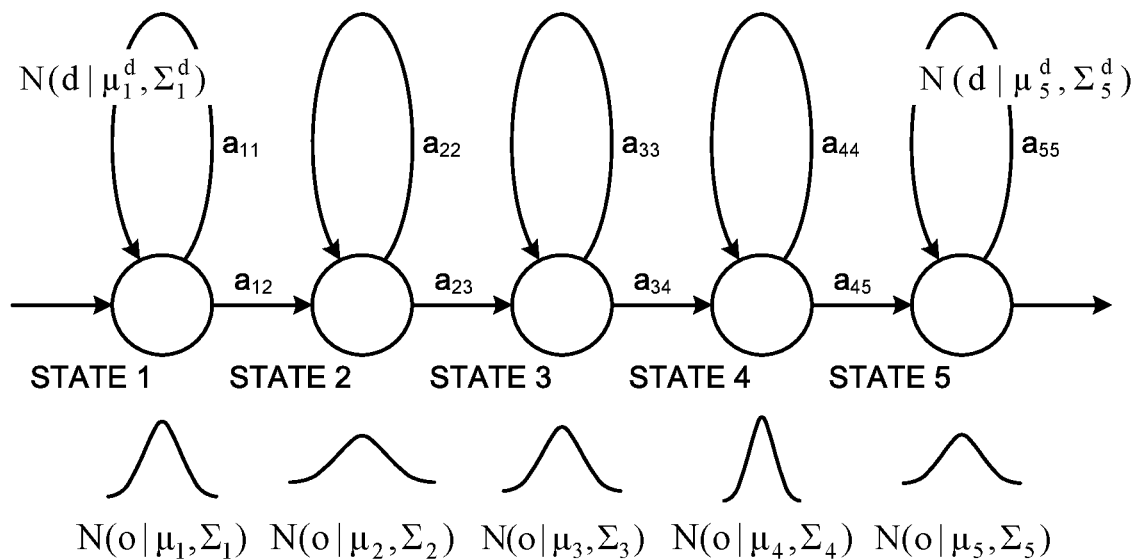
FIG. 2 is a diagram illustrating an HSMM.

When the HMM is a left-to-right HMM, as illustrated in FIG. 2, the HMM is modeled by an output distribution $N(o|\mu_i, \Sigma_i)$ and a state transition probability $a_{ij}$ (where i and j represent state indexes) and is modeled in such a way that only the transition probability to the neighboring state and the self-transition probability have values. Herein, instead of using the self-transition probability $a_{ij}$, if a duration distribution $N(d|\mu_i^d, \Sigma_i^d)$ is used, the HMM is called an HSMM (Hidden Semi-Markov Model) and is used in modeling the continuous length. In the following explanation, an HSMM is also referred to as an HMM.

Based on the HMM sequence created by the creating unit 102, the deciding unit 103 decides on the pitch-cycle waveform count using pitch parameters that are generated from the output distribution of duration distribution parameters and pitch feature parameters. That is, the deciding unit 103 decides on the pitch-cycle waveform count of each state using the duration, which is based on the duration distribution of each state of each statistical model in the statistical model sequence created by the creating unit 102, and using the pitch information, which is based on the output distribution of the pitch feature parameters.

The generating unit 104 creates a distribution sequence according to the pitch-cycle waveform count decided by the deciding unit 103, and generates acoustic feature parameters from the distribution sequence. More particularly, the generating unit 104 generates a distribution sequence of acoustic feature parameters based on the pitch-cycle waveform count, and generates acoustic feature parameters based on the generated distribution sequence.

The waveform generating unit 105 generates a speech waveform from the acoustic feature parameter sequence generated by the generating unit 104.

The HMM storing unit 106 stores the HMM that has been trained from the acoustic feature parameters based on the pitch synchronous analysis. More particularly, the HMM storing unit 106 stores a model in which the output distribution of each state of the HMM is subjected to decision tree clustering. Herein, as statistical model information, an output distribution of the acoustic feature parameters including the pitch feature parameters in each state of the HMM is stored along with a decision tree for selecting a duration distribution based on timing parameters and selecting a distribution of each state based on context information.

Figure 3:
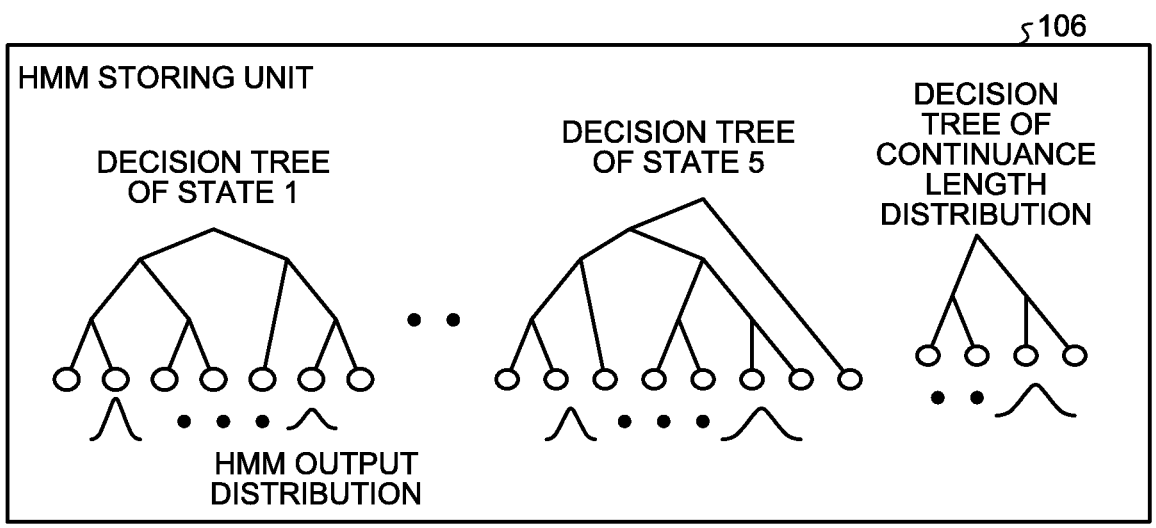
FIG. 3 is a diagram illustrating an HMM stored in an HMM storing unit.

FIG. 3 is a diagram illustrating an HMM stored in the HMM storing unit 106. As illustrated in FIG. 3, for example, the HMM storing unit 106 stores a decision tree representing a model of feature parameters of each state of the HMM and stores the output distribution of each leaf node of the decision tree; as well as stores the decision tree and distribution for duration distribution. Each node of the decision tree has a question for classifying the distribution associated thereto. For example, a node has a question such as "whether or not silence", "whether or not voiced sound", or "whether or not accent nucleus" associated thereto; and is classified into a child node corresponding to the question and a child node not corresponding to the question. That is, in the decision tree, with respect to the input context information, the search is performed by determining whether or not the context information corresponds to the question at each node, and leaf nodes are obtained.

That is, the creating unit 102 uses the distribution associated to the leaf nodes as the output distribution of each state, and builds an HMM corresponding to each speech unit. Then, the creating unit 102 creates an HMM sequence corresponding to the input context information.

Figure 4:
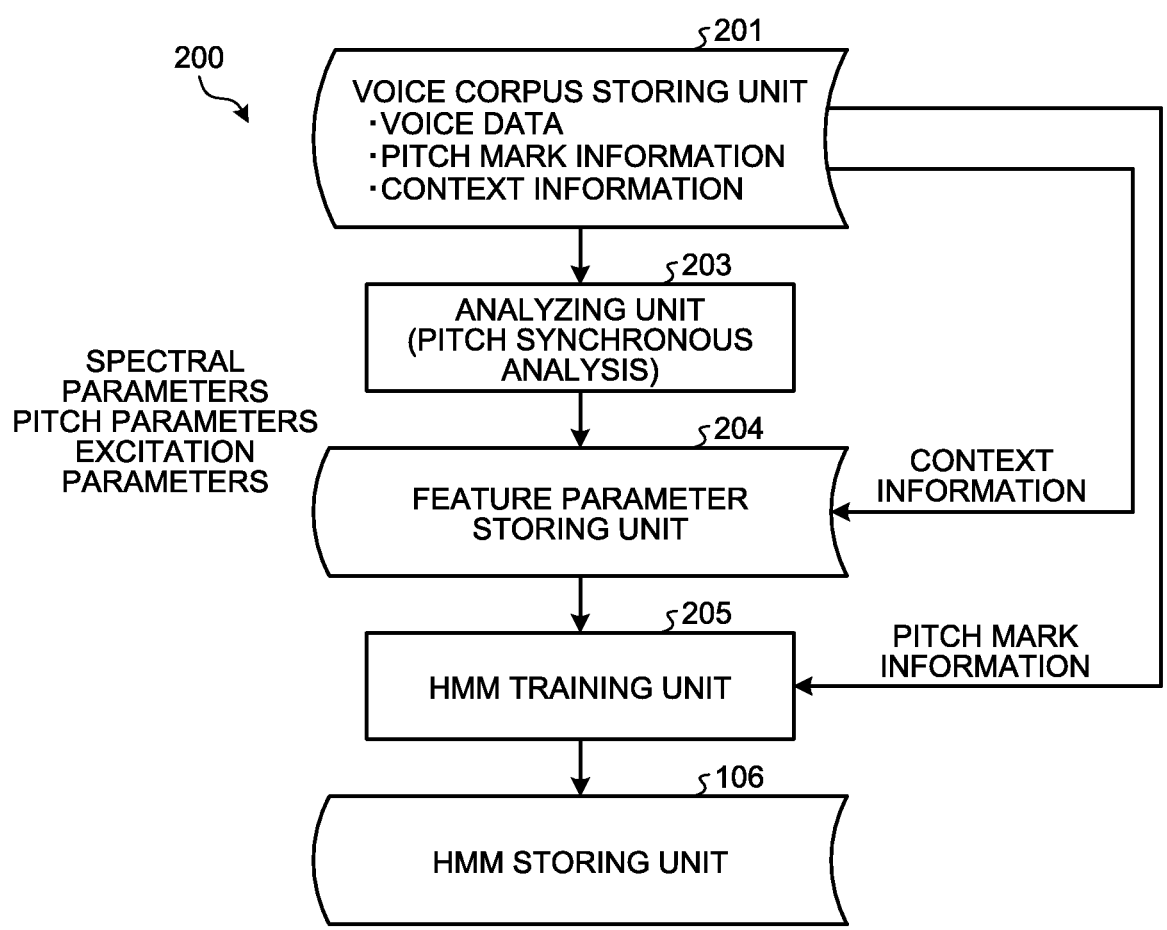
FIG. 4 is a block diagram illustrating a speech synthesis model training device according to the embodiment.

Given below is the explanation of the speech synthesis model training device according to the embodiment. FIG. 4 is a block diagram illustrating the speech synthesis model training device (a speech synthesis model training device 200) according to the embodiment. As illustrated in FIG. 4, the speech synthesis model training device 200 includes a speech corpus storing unit 201, an analyzing unit 203, a feature parameter storing unit 204, an HMM training unit 205, and the HMM storing unit 106. Herein, the HMM storing unit 106 included in the speech synthesis model training device 200 corresponds to the HMM storing unit 106 explained earlier with reference to FIG. 1. That is, as illustrated in FIG. 4, the HMM stored in the HMM storing unit 106 is created as a result of pitch synchronous analysis that is performed by the speech synthesis model training device 200 using pitch marks.

The speech corpus storing unit 201 stores the speech waveform (speech data) to be used in model training, and stores context information and pitch mark information corresponding to the speech waveform. The speech waveform is made of data clipped on a sentence-by-sentence basis from the recorded speech of the speaker. The context information is created from the uttered contents in each recorded speech.

With respect to the periodic sections of voiced sounds, the pitch mark information is created by extracting the pitch from the speech data and extracting the timing corresponding to the period. Moreover, regarding the pitch mark information, with respect to the non-periodic sections such as voiceless sounds or plosive sounds/silence, timing information that indicates the analysis central position with respect to the entire sentence is set by fixing the timing so as to enable smooth interpolation of the pitch of the periodic waveform of voiced sound sections and fixing the timing at a fixed frame rate in non-periodic sections. That is, the pitch mark information also contains the analysis timing of non-periodic sections. In this way, the pitch mark information is the information of the analysis central timing of each speech waveform; and the pitch mark information representing the analysis central timing and corresponding to the pitch period in the periodic waveform sections is created in a speech corpus.

The analyzing unit 203 obtains acoustic feature parameters from the speech waveform. The acoustic feature parameters are feature parameters including spectral parameters representing the spectral envelope of the speech, excitation parameters representing excitation information, and pitch parameters representing information about the fundamental frequency; and are extracted from the speech waveform. That is, the analyzing unit 203 analyzes, from the speech data, the acoustic feature parameters at each pitch mark timing specified in the pitch mark information.

As far as spectral parameters are concerned, it is possible to use spectral envelope parameters such as Mel-Cepstrum, Mel-LSP, and a linear predictive coefficient. As far as excitation parameters are concerned, band noise intensity (BAP: band aperiodicity) indicating the ratio of aperiodic components of each spectral band; phase information such as group delay information; are used.

Accordingly, the analyzing unit 203 can appropriately obtain the acoustic feature parameters corresponding to each pitch mark timing. FIG. 5 is a diagram illustrating the difference between the analysis based on a fixed frame rate and the pitch synchronous analysis in periodic waveform sections of a voiced sound.

Figure 5A:
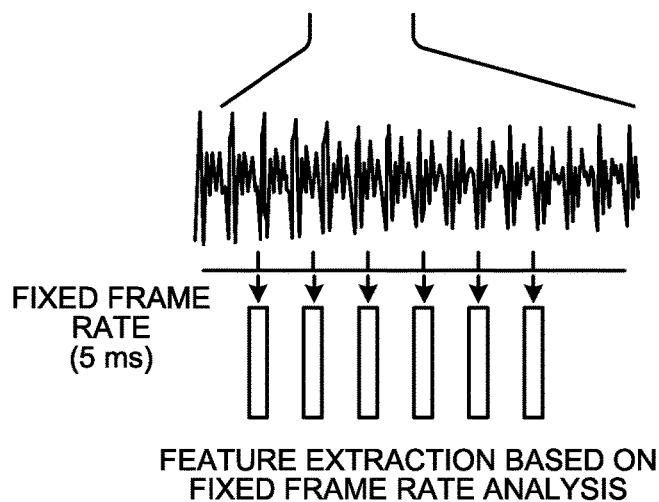
FIGS. 5A and 5B are diagrams illustrating the difference between the analysis based on a fixed frame rate and pitch synchronous analysis.

In FIG. 5A is illustrated the speech analysis based on a fixed frame rate. In the speech analysis based on a fixed frame rate, three is no relationship between the central timing of frames and the periodicity of the waveform, and feature analysis is performed according to a predetermined interval.

For example, in the speech analysis based on a fixed frame rate, the widely implemented analysis includes clipping a range including a plurality of periodic waveforms in a window function of approximately 25 ms. However, the peak position of the speech waveform and the frame positions have no relationship, thereby leading to distortion. As a result, in the speech analysis based on a fixed frame rate, there are times when the spectral envelope is unstable even in steady speech sections. Moreover, at the positions of sharp change, the analysis result includes excessive smoothing due to the effect of the wide window width, and there is a problem that the changing waveform cannot be properly reproduced.

Figure 5B:
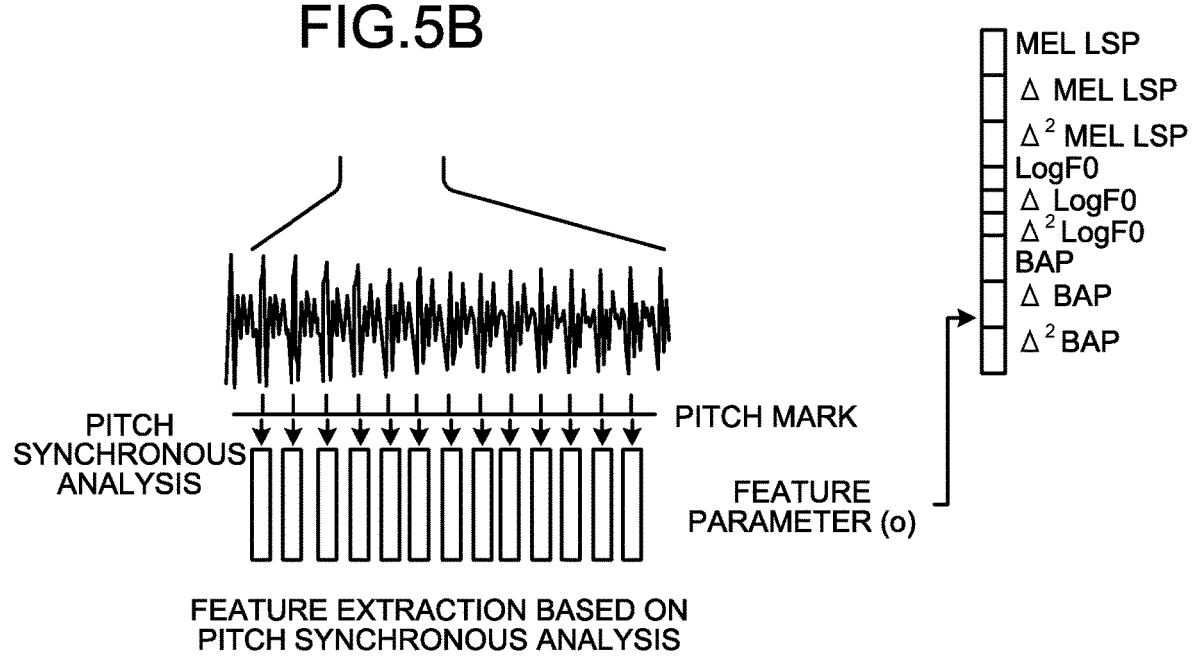

In contrast, in the feature extraction based on the pitch synchronous analysis, as illustrated in FIG. 5B, pitch marks are assigned to the timings corresponding to the pitch period according to a method of setting a pitch mark close to the peak timing of each period of the speech waveform, and a method is implemented in which the pitch mark timing is treated as the analysis center and the waveform is clipped using the Hanning window having the window width of approximately two pitches.

In this way, in the pitch synchronous analysis, it becomes possible to perform analysis at an appropriate timing using the window width dependent on the pitch, and the analysis-synthesis speech synthesized from the analyzed feature parameters has a waveform close to the original speech.

Moreover, in order to reduce the deterioration in the acoustic quality in the analysis based on a fixed frame rate, in the STRAIGHT analysis, the indefiniteness of the position of the analysis timing is corrected by performing smoothing of the time direction, and smoothing of the frequency direction is further performed to extract a smooth spectral envelope. Moreover, also in the case in which the analysis is performed by interpolating, at the fixed frame rate position, the parameters obtained by performing the pitch synchronous analysis; there is deterioration as compared to the case in which the parameters based on the pitch synchronous analysis are used as they are, and there occurs a distortion between the resynthesized speech waveform and the original speech waveform.

In the case of using Mel LSP and BAP as the acoustic feature parameters, Mel LSP analysis is applied to the speech extracted at each pitch mark and Mel LSP is obtained; pitch information is obtained from the information about the interval between the right-side pitch mark and the left-side pitch mark at each timing and is converted into logarithm $F_0$; and BAP is obtained by analyzing the band noise intensity. In the analysis of the band noise intensity, for example, based on the PSHF (Pitch Scaled Harmonic Filter) method, the speech can be separated into a periodic component and an aperiodic component; the aperiodic component ratio at each timing can be obtained; and BAP can be obtained by taking average for each predetermined band.

Moreover, in the case of using phase feature parameters, the phase information of each pitch-cycle waveform extracted pitch synchronously is expressed as a parameter; and phase information that is difficult to handle in the analysis based on a fixed frame rate, in which the shape of a waveform including a plurality of periods or the shape of a waveform clipped by the central position becomes an unstable shape, can also be treated as a feature parameter as a result of using the pitch synchronous analysis.

The pitch information or the duration information is a feature parameter representing prosody information, and is extracted from each speech waveform of the speech corpus in an identical manner. The pitch information indicates the variation in the intonation or the height of fundamental frequency of each vocal sound. The duration is a feature parameter indicating the length of the speech units such as phonemes. As far as the pitch feature parameters are concerned, it is possible to use the logarithmic fundamental frequency, the fundamental frequency, and the pitch period information. As far as the duration information is concerned, it is possible to use the phoneme duration.

In the pitch synchronous analysis, the pitch of each pitch mark timing is set from the intervals on the right-hand side and the left-hand side of the pitch mark timing, and is converted into the logarithmic fundamental frequency. Although the pitch information is a parameter in which only the voiced sound has a value, it is alternatively possible to assign an interpolated pitch to the portion of voiceless sound and treat that portion as a feature parameter, or to use a value indicating the voiceless sound.

The information about the duration of each phoneme is attached as information about the phoneme boundary timing to the context information, and is used in training the initial model at the time of training the HMM. However, since the parameters of the duration distribution based on the HSMM are obtained by performing maximum likelihood estimation from the association of each HMM state and the training data, there are also times when the phoneme timings are not provided as the feature parameters in advance. In this way, the analyzing unit 203 obtains the acoustic feature parameters at each pitch mark timing, and creates feature parameters to be used in HMM training. Moreover, the analyzing unit 203 also obtains and attaches the dynamic feature quantities (in FIG. 5, the $\Delta$ parameter and the $\Delta^2$ parameter) representing the information about the inclination of the feature parameters. Consequently, the acoustic feature parameters as illustrated in FIG. 5B get configured.

The feature parameter storing unit 204 (FIG. 4) is used to store the acoustic feature parameters, which are obtained by the analyzing unit 203, along with the context information and the time boundary information. The HMM training unit 205 uses the feature parameters, which are stored in the feature parameter storing unit 204, as HMM training data. Herein, the HMM training unit 205 trains the Hidden Semi-Markov Model, which performs concurrent estimation of the parameters of the duration distribution, as HMM training. That is, during the training of the Hidden Semi-Markov Model, in order to use the pitch synchronous analysis in addition to using the context information and the acoustic feature parameters, the HMM training unit 205 receives input of the pitch mark information of each set of speech data, and implements the training of the duration distribution using the timing information. That is, from the acoustic feature parameters analyzed by the analyzing unit 203, the HMM training unit 205 trains a statistical model that has the output distribution of the acoustic feature parameters including the pitch feature parameters and that has a plurality of states including the duration distribution based on the timing parameters.

FIG. 6 is a flowchart for explaining the operations performed by the HMM training unit 205. The HMM training unit 205 firstly initializes a phoneme HMM (S101), performs maximum likelihood estimation of the phoneme HMM by training the HSMM (S102), and trains the phoneme HMM representing the initial model. In the case of performing maximum likelihood estimation, the HMM training unit 205 associates the HMM to the sentence by performing coupled training, and performs training while doing probabilistic association of each state and the feature parameters from the HMM of the entire concatenated sentence and from the acoustic feature parameters corresponding to the sentence.

Then, the HMM training unit 205 initializes the context-dependent HMM using the phoneme HMM (S103). Herein, phoneme environment and language information such as the concerned phonemes; the previous and subsequent phoneme environments; position information such as within sentence/ accent phrase; the accent type; and whether or not to raise the ending are used with respect to the context present in the training data, and a model initialized with the concerned phonemes is provided.

Subsequently, the HMM training unit 205 applies embedded-training-based maximum likelihood estimation with respect to the context-dependent HMM and trains the HMM (S104), and applies state clustering based on the decision tree (S105). In this way, the HMM training unit 205 builds a decision tree with respect to each state/each stream of the HMM and with respect to the state duration distribution.

More particularly, from the state-by-state/stream-by-stream distribution, the HMM training unit 205 trains the rules for classifying a model according to the maximum likelihood criteria or the MDL (Minimum Description Length) criteria, and builds the decision tree illustrated in FIG. 3. In this way, at the time of speech synthesis, even when an unknown context not present in the training data is input, the distribution of each state is selected by traversing the decision tree, and the HMM training unit 205 can build the corresponding HMM.

Lastly, the HMM training unit 205 performs maximum likelihood estimation of the model that has been subjected to clustering, and ends the model training (S106).

At the time of performing the clustering, the HMM training unit 205 builds a decision tree for each stream of each feature quantity, and thus builds a decision tree of each stream of spectral information (Mel LSP)/excitation information (BAP)/pitch information (logarithmic fundamental frequency). Moreover, the HMM training unit 205 builds a decision tree with respect to a multidimensional distribution having state-by-state durations arranged therein, and builds a duration distribution decision tree of the unit of HMM. Meanwhile, at each maximum likelihood estimation step, at the time of updating the model, the HMM training unit 205 trains the state duration distribution by referring to the pitch mark timing information in addition to referring to the context information and the acoustic feature.

Moreover, at the time of training the duration distribution using the timing information corresponding to each acoustic feature, the HMM training unit 205 obtains the timing-parameter-based duration not from the frame count associated to each state but from the timing at the start point and the timing at the end point of the frame associated to each state. Then, the HMM training unit 205 becomes able to obtain the duration distribution from the obtained duration; and, as in the case of the pitch synchronous analysis, can train a proper duration distribution even if the training is performed using parameters subjected to feature analysis at nonlinear intervals.

Meanwhile, in the HSMM in which the pitch mark timings are used, maximum likelihood estimation is performed using coupled training according to an algorithm described later. Then, the HMM created by the HMM training unit 205 is stored in the HMM storing unit 106.

That is, in the speech synthesis device 100, the creating unit 102 creates an HMM sequence from the input context and from the HMM stored in the HMM storing unit 106, and the deciding unit 103 decides on the pitch-cycle waveform count of each state of the HMM. Then, in the speech synthesis device 100, a distribution sequence is created by repeating the distribution of each state according to the decided pitch-cycle waveform count, and the generating unit 104 generates parameters according to a parameter generation algorithm in which the static/dynamic feature quantities are taken into account.

Figure 7:
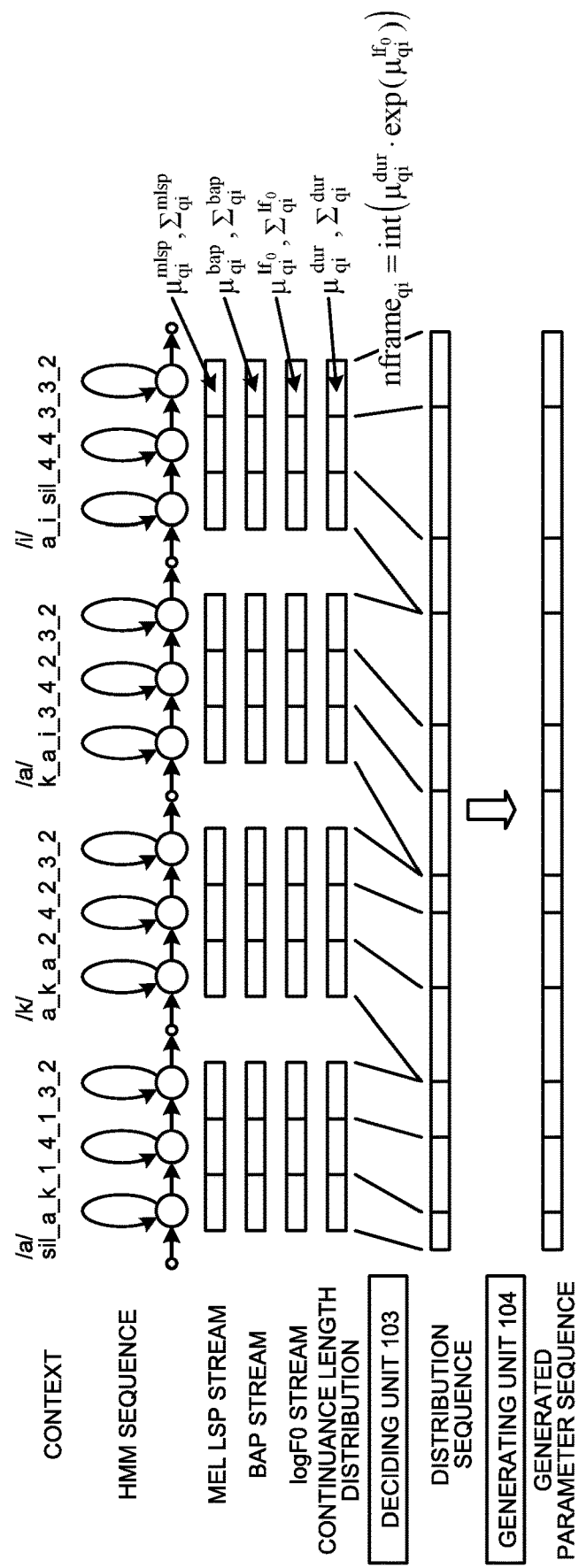
FIG. 7 is a diagram illustrating exemplary operations by which parameters are generated in the speech synthesis device according to the embodiment.

FIG. 7 is a diagram illustrating exemplary operations by which parameters are generated in the speech synthesis device 100. In FIG. 7 is illustrated a case in which the speech synthesis device 100 synthesizes a speech "akai" in a three-state HMM.

Firstly, the creating unit 102 selects the distribution and the duration distribution of each state/each stream of the HMM of the input context, and configures an HMM sequence. When "preceding phoneme_concerned phoneme_subsequent phoneme_phoneme position_phoneme count_mora position_mora count_accent type" is used as the context, "akai" is 3-mora 2-type and the phoneme of the initial "a" has the preceding phoneme of "sil", the concerned phoneme of "a", the subsequent phoneme of "k", the phoneme position of "1", the phoneme count of "4", the mora position of "1", the mora count of "3", and the accent type of "2-type"; and thus has the context "sil_a_k_1_4_1_3_2".

In the case of tracing the decision tree of the HMM, a question such as whether or not the concerned phoneme is "a" or whether or not the accent type is "2-type" is set in each intermediate node. Thus, when the question is traced, a distribution of leaf nodes gets selected, and the distribution of streams and duration distributions of Mel LSP, BAP, and Log F0 gets selected for each state of the HMM and an HMM sequence is configured. Then, the deciding unit 103 decides the frame count of the pitch-cycle waveform according to Equation 1 given below.

$$nframe_{qi} = \text{int}(\mu_{qi}^{dur} \cdot \exp(\mu_{qi}^{lf0})) \quad (1)$$

Herein, since the Log $F_o$ is treated as the distribution of the pitch information, an mean value $\mu^{dur}_{qi}$ of the state duration distribution of a model q and a state i is multiplied to a fundamental frequency $\exp(\mu^{lf0}_{qi})$ that is obtained from an mean value $\mu^{lf0}_{qi}$ of the static feature quantity of the logarithmic fundamental frequency stream of the model q and the state i; the multiplication result is rounded down or an integer formation function int( ) is applied for rounding off; and the pitch-cycle waveform count is set.

Since the mean value $\mu^{dur}_{qi}$ that is obtained using the time information of the pitch mark timing is the duration distribution, in the case of obtaining the frame count, the pitch information becomes necessary. In the conventional method, since the frame count is expressed without modification as the duration distribution, it is set simply by integer formation as given below in Equation 2.

$$nframe_{qi} = \text{int}(\mu_{qi}^{dur}) \quad (2)$$

As described above, when feature parameter analysis is performed at a fixed frame rate and when there is a linear relationship among timings, the frame count can be obtained according to Equation 2 given above. However, in the case of performing speech analysis at variable frame rates during the pitch synchronous analysis, the timings need to be used as the parameters of the duration distribution, and the waveform count needs to be set according to Equation 1 given earlier.

Meanwhile, herein, the logarithmic fundamental frequency is used as a feature parameter of the pitch information. However, in the case of using the fundamental frequency, the exp( ) function becomes unnecessary. Moreover, in the case of using the pitch period as a parameter, division is performed according to Equation 3 given below.

$$nframe_{qi} = \text{int}(\mu_{qi}^{dur}/\mu_{qi}^{pitch}) \quad (3)$$

The generating unit 104 creates a distribution sequence by repeating the distribution of each state of the HMM according to the pitch-cycle waveform count set as explained, and a parameter sequence is generated according to a parameter generation algorithm in which the static/dynamic feature quantity is used. When $\Delta$ and $\Delta^2$ are used as dynamic feature parameters, the output parameters are obtained according to the following method. A feature parameter $o_t$ at a timing t is expressed as $o_t=(c_t, \Delta c_t, \Delta^2 c_t)$ using a static feature parameter $c_t$ and dynamic feature parameters $\Delta c_t$ and $\Delta^2 c_t$ that are set from the feature parameters of the preceding and subsequent frames. Regarding a vector $C=(c_{0'}, \ldots, c_{T-1'})$ made of static feature quantities $c_t$ that maximize $P(O|J, \lambda)$, with $0_{TM}$ representing the zero vector of T×M order, the vector C is obtained by solving the equation given below in Equation 4.

$$\frac{\partial}{\partial C} \log P(O \mid J, \lambda, T) = O_{TM} \quad (4)$$

Herein, T represents the frame count and J represents the state transition sequence. If the relationship between the feature parameter O and the static feature parameter C is associated using a matrix W meant for calculating the dynamic features, then the relationship is expressed as O=WC. Herein, O is a 3TM vector; C is a TM vector; and W is a 3TM×TM matrix. Then, an mean vector of distributions corresponding to a sentence in which an mean vector of the output distribution at each time and all diagonal covariances are arranged and a covariance matrix are $\mu=(\mu S_{00'}, \ldots, \mu_s J\text{-}1Q\text{-}1')$ and $\Sigma=\text{diag}(\Sigma_{s00'}, \ldots, E_s J\text{-}1Q\text{-}1')$; an equation given below in Equation 5 can be solved so that Equation 4 enables obtaining the most suitable feature parameter sequence C.

$$W'\Sigma^{-1}WC = W'\Sigma^{-1}\mu \quad (5)$$

This equation is obtained by implementing a method according to Cholesky decomposition. Moreover, in an identical manner to the solution used in the time updating algorithm of the RLS filter, a parameter sequence can be generated in order of time accompanied by the delay, or a parameter sequence can be generated with a low delay. Meanwhile, the operations of the parameter generating unit are not limited to the method explained herein, and a method of interpolating the mea vector or some other arbitrary method of generating feature parameters from a distribution sequence can be alternatively implemented.

The waveform generating unit 105 generates a speech waveform from the parameter sequence generated in the manner described above. For example, the waveform generating unit 105 creates an excitation signal from the logarithmic fundamental frequency sequence and the band noise intensity sequence, and generates a speech waveform by applying a vocal tract filter based on the Mel LSP sequence.

Figure 8:
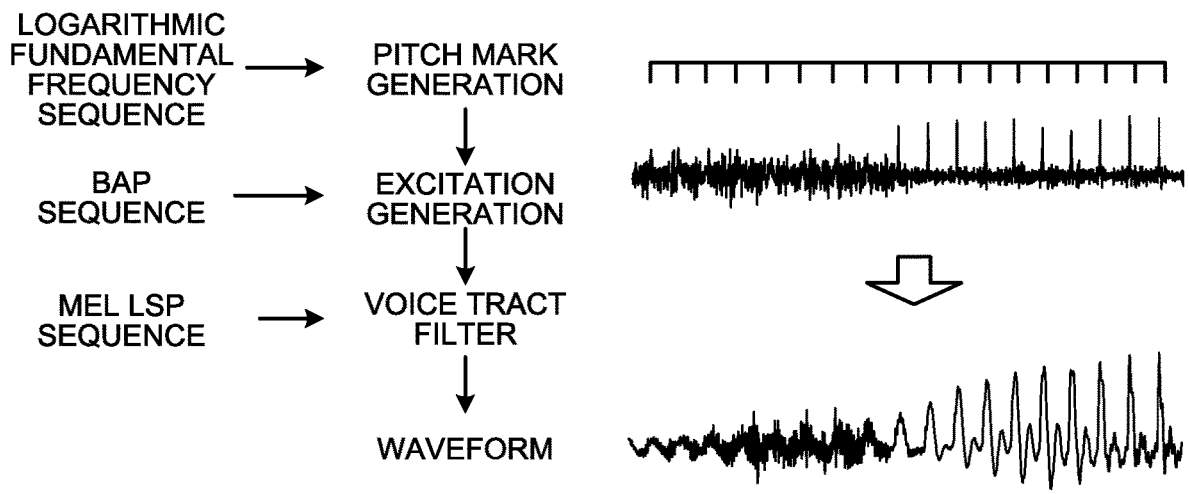
FIG. 8 is a diagram illustrating the operations performed by a waveform generating unit.

FIG. 8 is a diagram illustrating the operations performed by the waveform generating unit 105. As illustrated in FIG. 8, the waveform generating unit 105 generates pitch marks from the logarithmic fundamental frequency sequence; generates the excitation signal by controlling the ratio of the noise component and the pulse component according to the band noise intensity (BAP); and generates a speech waveform by applying the vocal tract filter based on the Mel LSP sequence. Moreover, in the case of performing modeling also using phase parameters, the waveform generating unit 105 generates a phase spectrum from the phase parameters, generates an amplitude spectrum from the spectrum parameters, generates a pitch-cycle waveform corresponding to each pitch mark according to inverse FFT, and generates a waveform according to a overlap-add operation. Alternatively, the waveform generating unit 105 can generate an excitation signal from the phase parameters, and can generate a waveform according to a method of applying a filter.

As a result of the operations explained above, an HMM model can be built using the feature parameters for which the pitch synchronous analysis is used, and can be used in speech analysis. Moreover, as a result of those operations, a synthesized speech corresponding to the input context can be obtained.

Given below is the explanation of the details of the model reestimation algorithm in the likelihood estimation operation performed by the HMM training unit 205. This algorithm is derived by expanding the conventional Hidden Semi-Markov Model training algorithm to enable training of the duration distribution from the timing information of the feature parameters. In the conventional method, based on the Hidden Semi-Markov Model, the number of frames that remained present in each state is used as the duration distribution related to the self-transition probability. In contrast, the HMM training unit 205 trains the duration distribution while the interval of pitch timings in each frame instead of the frame count serves as the unit. As a result, the duration distribution becomes independent of the pitch and directly represents the phonemes and the duration of each state. With that, the problem that a mismatch in the pitch at the time of speech synthesis leads to an unnatural duration gets resolved.

In the HMM, with respect to a model λ, the state transition sequence Q={$q_0, q_1, \ldots, q_{T-1}$}, the state transition probability $a_{ij}$ from the state i to the state j, and the output distribution $b_i(o_t)$ of the state i; the likelihood P(O|λ) of an observation vector sequence O={$o_0, o_1, \ldots, o_{T-1}$} is expressed as the sum of all state transition sequences as given below in Equation 6.

$$P(O \mid \lambda) = \sum_Q a_{q_0 q_1} \prod_t b_{q_t}(O_t) a_{q_t q_{t+1}} \quad (6)$$

In the HMM, all state transitions are expressed as the state transition probability as given above in Equation 6. In the Hidden Semi-Markov Model (HSMM), the self-transition probability is expressed as the duration distribution.

$$P(O \mid \lambda) = \sum_Q a_{q_0 q_1} \prod_t \{\prod_d b_{q_t}(O_{t+d})\} p_{q_t}(t, d) a_{t+d q_{t+d+1}} \quad (7)$$

Herein, $p_i(t, d)$ represents the probability at which d number of frames remain present from the timing t to the timing t+d in the state i; and $a_{q_{t+d} q_{t+d+1}}$ represents the probability of transition to a different state $q_{t+d+1}$ at the timing t+d.

$$p_{q_t}(t,d) = N(d+1 \mid \mu_d, \sigma_d^2) \quad (8)$$

In the conventional method, the frame number of the observation frame is used as the timing t and, in all state transition sequences, the probability of duration of the same state for d number of frames and the probability of subsequent state transition are calculated. Thus, in the updating algorithm for the output distribution parameters, the state transition probability, and the state duration distribution parameters using the Forward-Backward algorithm with respect to an HSMM, model parameters can be obtained by performing maximum likelihood estimation.

In the HSMM to be used in the pitch synchronous analysis performed by the HMM training unit 205, the state duration $p_i(t, d)$ represents not the frame count but the timing information as a parameter. When pm(t) represents the pitch mark timing of each frame from the timing information of the pitch mark corresponding to each frame, the state duration from the timing t to the timing t+d becomes d(t, d)=pm(t+d)−pm(t−1), and the HMM training unit 205 uses the interval of such pitch mark timings as a parameter of the duration distribution.

$$p_{q_t}(d,d) = N(pm(t+d) - pmt(t-1) \mid \mu_d, \sigma_d^2) \quad (9)$$

In the pitch synchronous analysis, waveform analysis is performed with the pitch mark position representing the center of the frame. At that time, if the frame count is expressed as the state duration distribution; then, higher the pitch, the narrower becomes the interval between the pitch marks thereby leading to an increase in the frame count. That is, lower the pitch, the wider becomes the interval between the pitch marks and the frame count becomes small. Hence, the distribution of state durations becomes dependent not only on the duration but also on the pitch.

In contrast, since the HMM training unit 205 models the duration of each state without modification and regardless of the pitch, the length of each phoneme can be modeled independent of the pitch. When analysis is performed at a fixed frame rate, a linear relationship is achieved regardless of whether the timing information is used or the frame count is used, and hence the analysis is not affected. Even in the case in which the interval among the frames is not constant, the HMM training unit 205 can properly calculate the duration model.

Given below is the explanation of the updating algorithm based on the Forward-Backward algorithm for coupled training of a model in the case in which the HMM training unit 205 performs maximum likelihood estimation. Firstly, the forward probability is calculated according to Equations 10 to 17 given below. A forward probability $\alpha(q)_j(t, d)$ represents the probability of the model q being in the state j at the timing t after d number of continuous frames. Firstly, at the timing (t=1), the initialization is performed according to Equations 10 to 13 given below.

state 1 (q = 1)  (10)
$$\alpha_1^{(q)}(1, 1) = 1$$

state 1 (q > 1)  (11)
$$\alpha_1^{(q)}(1, 1) = \alpha_1^{(q-1)}(1, 1) a_{1N_{q-1}}^{(q-1)}$$

state j ($2 \le j \le N_q - 1$)  (12)
$$\alpha_j^{(q)}(1, 1) = \alpha_1^{(q)}(1, 1) a_{1j}^{(q)} b_j^{(q)}(o_1)$$
$$\alpha_j^{(q)}(1, d) = 0, \left(2 \le d \le D_j^{(q)}\right)$$

state $N_q$  (13)
$$\alpha_{N_q}^{(q)}(1, 1) = \sum_{i=2}^{N_q - 1} \alpha_i^{(q)}(1, 1) a_{i N_q}^{(q)} p_i^{(q)}(1, 1)$$

Then, recursive calculation is performed according to Equations 14 to 17 given below, and the forward probability $\alpha(q)_j(t, d)$ of ($2 \le t \le T$) number of frames is obtained.

state 1 (q = 1)  (14)
$$\alpha_1^{(q)}(t, 1) = 0$$

state 1 (q > 1)  (15)
$$\alpha_1^{(q)}(t, 1) = \alpha_{N_{q-1}}^{(q-1)}(t - 1, 1) + \alpha_1^{q-1}(t, 1) a_{1 N_{q-1}}^{(q-1)}$$

state j ($2 \le j \le N_q - 1$)  (16)
$$\alpha_j^{(q)}(t, 1) =$$
$$\left[\alpha_1^{(q)}(t, 1) a_{1j}^{(q)} + \sum_{i=2}^{N_q-1} \sum_{d=1}^{D^{(q)}} \alpha_i^{(q)}(t-1, d) p_i^{(q)}(t-1, d) a_{ij}^{(q)}\right] b_j^{(q)}(o_t)$$
$$\alpha_j^{(q)}(t, d) = b_j^{(q)}(o_t) \alpha_j^{(q)}(t-1, d-1), \left(2 \le d \le D_j^{(q)}\right)$$

state $N_q$  (17)
$$\alpha_{N_q}^{(q)}(t, 1) = \sum_{i=2}^{N_q-1} \sum_{d=1}^{D^{(q)}} \alpha_i^{(q)}(t, d) p_i^{(q)}(t, d) a_{i N_q}^{(q)}$$

In an identical manner, a backward probability $\beta(q)_i(t, d)$ represents the probability at which, at the timing t, d number of frames are present in the state i and subsequently an observation vector is output till a timing T; and is calculated according to Equations 18 to 25 given below. Firstly, at the timing (t=T), initialization is performed according to Equations 18 to 21 given below.

state $N_q$ $(q = Q)$ (18)

$$\beta_{N_q}^{(q)}(T, 1) = 1$$

state $N_q$ $(q < Q)$ (19)

$$\beta_{N_q}^{(q)}(T, 1) = a_{1N_{q+1}}^{(q+1)} \beta_{N_{q+1}}^{(q+1)}(T, 1)$$

state $i$ $(2 \le i \le N_q - 1)$ (20)

$$\beta_i^{(q)}(T, 1) = a_{iN_q}^{(q)} \beta_{N_q}^{(q)}(T, 1)$$

$$\beta_i^{(q)}(T, d) = 0 \left( 2 \le d \le D_i^{(q)} \right)$$

state 1 (21)

$$\beta_1^{(q)}(T, 1) = \sum_{i=2}^{N_q - 1} a_{1j}^{(q)} p_j^{(q)}(T, 1) b_j^{(q)}(o_T) \beta_1^{(q)}(T, 1)$$

Then, according to the recursion (T−1≤t≤1) step as given below in Equations 22 to 25, the backward probability β(q)$_i$(t, d) is calculated.

state $N_q$ $(q = Q)$ (22)

$$\beta_{N_q}^{(q)}(t, 1) = 0$$

state $N_q$ $(q < Q)$ (23)

$$\beta_{N_q}^{(q)}(t, 1) = \beta_1^{(q+1)}(t+1, 1) + \beta_{N_{q+1}}^{(q+1)}(t, 1) a_{1N_{q+1}}^{(q+1)}$$

state $i$ $(2 \le i \le N_q - 1)(1 \le d \le D_i^{(q)})$ (24)

$$\beta_i^{(q)}(t, 1) =$$

$$\beta_{N_q}^{(q)}(t, 1) a_{iN_q}^{(1)} + \sum_{\substack{j=2 \\ i \ne j}}^{N_q - 1} \sum_{d=1}^{D_j^{(q)}} a_{ij}^{(q)} p_j^{(q)}(t+1, d) b_j^{(q)}(o_{t+1}) \beta_j^{(q)}(t+1, d)$$

$$\beta_i^{(q)}(t, d) = b_j^{(q)}(o_{t+1}) \beta_i^{(q)}(t+1, d-1), \left( 2 \le d \le D_i^{(q)} \right)$$

state 1 (25)

$$\beta_1^{(q)}(t, 1) = \sum_{i=2}^{N_q - 1} \sum_{d=1}^{D_j^{(q)}} a_{1j}^{(q)} p_j^{(q)}(t, d) b_j^{(q)}(o_t) \beta_j^{(q)}(t, d)$$

When these Equations are used along with the mixture Gaussian distribution, the probability of presence of the model q in the state j, a mixture m, and a stream s at the timing t is obtained according to Equations 26 to 28 given below.

$t = 1, 1 \le q \le Q, 1 < j < N_q$ (26)

$$U_j^{(q)}(1, 1) = a_1^{(q)}(1, 1) \alpha_{1j}^{(q)},$$

$$U_j^{(q)}(1, d) = p \left( 2 \le d \le D_i^{(q)} \right)$$

$1 < t \le T, 1 \le q \le Q, 2 < j < N_q$ (27)

$$U_j^{(q)}(t, 1) = \alpha_1^{(1)}(t, 1) a_{1j}^{(q)} + \sum_{\substack{i=2 \\ i \ne j}}^{N_q - 1} \sum_{d=1}^{D_j^{(q)}} \alpha_i^{(q)}(t-1, d) p_i^{(q)}(t-d, d) a_{ij}^{(q)}$$

$$U_i^{(q)}(t, d) = \alpha_j^{(q)}(t-1, d-1) = b_j^{(q)}(o_{t-1}) \alpha_j^{(q)}(t-2, d-2)$$

$1 < t \le T, 1 \le q \le Q, 2 < j < N_q$ (28)

$$L_{jsm}^{(q)}(t) =$$

$$\frac{1}{P} \Biggl\{ \sum_{d_l=1}^{D_j^{(q)}} \sum_{d_r=1}^{D_j^{(q)} - d_l} p_j^{(q)}(t - d_l + 1, d_l + d_r - 1) \cdot U_j^{(q)}(t, d_l) c_{jsm}^{(q)}$$

$$b_{jsm}^{(q)}(o_{st}) \} \beta_j^{(q)}(t, d_r) b_{js}^{(q)*}(o_t) \Biggr\}$$

Moreover, the probability of presence of the model q in the state j at the timing t is obtained according to Equation 29 given below.

$1 \le t \le T, 1 \le q \le Q, 2 < j < N_q$ (29)

$$L_j^{(q)}(t) =$$

$$\frac{1}{P} \Biggl\{ \sum_{d_l=1}^{D_j^{(q)}} \sum_{d_r=1}^{D_j^{(q)} - d_l} p_j^{(q)}(t - d_l + 1, d_l + d_r - 1) \alpha_j^{(q)}(t, d_l) \beta_j^{(q)}(t, d_r) \Biggr\}$$

Figure 9:
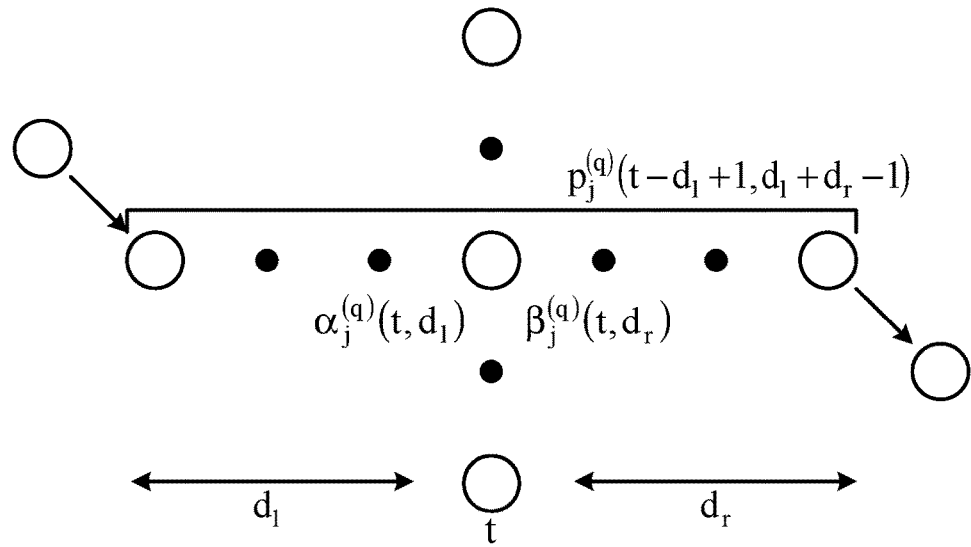
FIG. 9 is a diagram illustrating a method for calculating the state occupancy probability.

Equations 28 and 29 given above are different than the conventional coupled training and, as illustrated in FIG. 9, represent the sum of all state transition sequences passing through the state j of the model q at the timing t when the transitions across the states are also taken into account.

Furthermore, the probability of presence of the model q in the state j and the stream s from the timing $t_0$ to the timing $t_1$ is expressed according to Equation 30 given below.

$1 \le t_0 \le T, t_0 \le t_1 \le T, 1 \le q \le Q, 2 < j < N_q$ (30)

$$K_j^{(q)}(t_0, t_1) = \frac{1}{P} \Biggl\{ \sum_{i=1, i \ne j}^{N} \sum_{d_l=1}^{D_j^{(q)}} \sum_{d_r=1}^{D_j^{(q)}} \alpha_i^{(q)}(t_0 - 1, d_l)$$

$$a_{ij} \cdot \prod_{t=t_0}^{t_1} b_j^{(q)}(o_t) p_j^{(q)}(t_0, t_1 - t_0 + 1) \beta_j^{(q)}(t_1, d_r) \Biggr\}$$

Using the state transition probability, the forward probability, and the backward probability derived in the manner described above, the model parameters are updated and maximum likelihood estimation of the output distribution parameters, the duration model, and the transition probability is performed. The updating equations for the duration distribution parameters are expressed according to Equations 31 and 32 given below.

$$\mu_j^{(q)dur} = \frac{\sum_{t_0=1}^{T} \sum_{t_1=t_0}^{T} K_j^{(q)}(t_0, t_1)(pm(t_1) - pm(t_0 - 1))}{\sum_{t_0=1}^{T} \sum_{t_1=t_0}^{T} K_j^{(q)}(t_0, t_1)} \quad (31)$$

-continued $$\sigma_j^{2(q)dur} = \frac{\sum_{t_0=1}^{T}\sum_{t_1=t_0}^{T} K_j^{(q)}(t_0, t_1)(pm(t_1) - pm(t_0 - 1))^2}{\sum_{t_0=1}^{T}\sum_{t_1=t_0}^{T} K_j^{(q)}(t_0, t_1)} - \left(\mu_j^{(q)dur}\right)^2 \quad (32)$$

Meanwhile, the mixture weight, the mean vector, and the covariance matrix of the output distribution are updated according to Equations 33 to 35 given below.

$$w_{jsm}^{(q)} = \frac{\sum_{q=1}^{Q}\sum_{t=1}^{T} L_{jsm}^{(q)}(t)}{\sum_{q=1}^{Q}\sum_{t=1}^{T} L_{j}^{(q)}(t)} \quad (33)$$

$$\mu_{jsm}^{(q)} = \frac{\sum_{q=1}^{Q}\sum_{t=1}^{T} L_{jsm}^{(q)}(t) o_{st}^{(q)}}{\sum_{q=1}^{Q}\sum_{t=1}^{T} L_{jsm}^{(q)}(t)} \quad (34)$$

$$\Sigma_{jsm}^{(q)} = \frac{\sum_{q=1}^{Q}\sum_{t=1}^{T} L_{jsm}^{(q)}(t)\left(o_{st}^{(q)} - \mu_{jsm}^{(q)}\right)\left(o_{st}^{(q)} - \mu_{jsm}^{(q)}\right)^T}{\sum_{q=1}^{Q}\sum_{t=1}^{T} L_{jsm}^{(q)}(t)} \quad (35)$$

Using Equations 10 to 35, the HMM training unit 205 performs maximum likelihood estimation of the model parameters.

Figure 10:
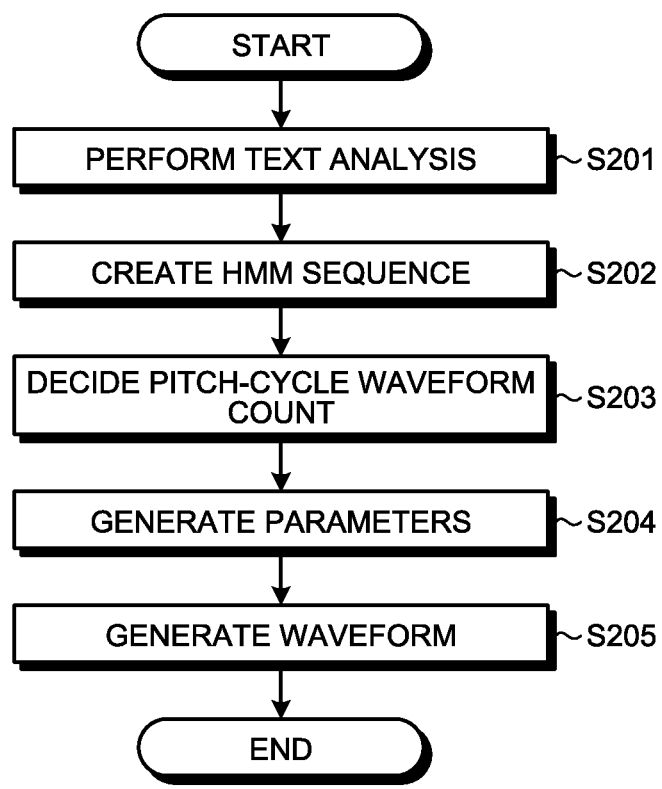
FIG. 10 is a flowchart for explaining the operations performed in the speech synthesis device according to the embodiment.

Given below is the explanation of operations for speech synthesis performed in the speech synthesis device 100. FIG. 10 is a flowchart for explaining the operations for speech synthesis performed in the speech synthesis device 100. As illustrated in FIG. 10, firstly, the analyzing unit 101 analyzes the input text and obtains the context information (S201). The creating unit 102 refers to the HMM stored in the HMM storing unit 106 and creates an HMM sequence corresponding to the input context (S202).

The deciding unit 103 decides on the pitch-cycle waveform count of each state using the duration distribution and the pitch information of the HMM sequence (S203). The generating unit 104 creates a distribution sequence in which the output distributions are arranged according to the pitch-cycle waveform count of each state, and generates a parameter sequence to be used in speech synthesis from the distribution sequence by applying a parameter generation algorithm (S204). Then, the waveform generating unit 105 generates a speech waveform and obtains a synthesized speech (S205).

Meanwhile, the functions of the speech synthesis device 100 either can be implemented using hardware or can be implemented using software executed by a CPU. For example, when the speech synthesis device 100 performs speech synthesis by executing a speech synthesis program, then the steps illustrated in FIG. 10 are executed by the CPU.

Figure 11:
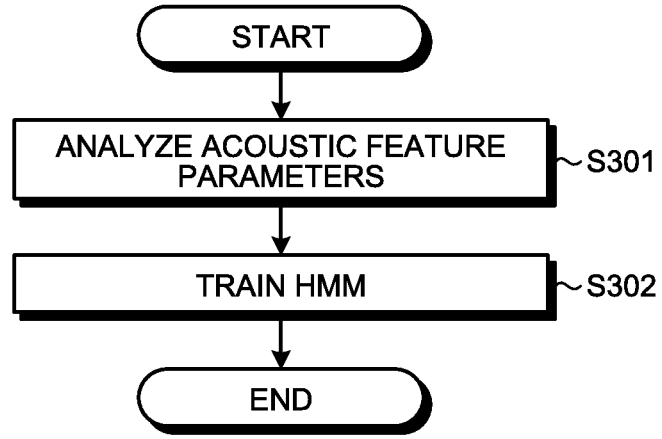
FIG. 11 is a flowchart for explaining the operations performed in the speech synthesis model training device according to the embodiment.

Given below is the explanation about the operations for speech synthesis model training as performed in the speech synthesis model training device 200. FIG. 11 is a flowchart for explaining the operations for speech synthesis model training as performed in the speech synthesis model training device 200. As illustrated in FIG. 11, firstly, the analyzing unit 203 refers to the speech data stored in the speech corpus storing unit 201 and refers to the pitch mark information, and extracts acoustic feature parameters including spectral parameters, pitch parameters, and excitation parameters by performing the pitch synchronous analysis (S301). The feature parameter storing unit 204 stores the extracted acoustic feature parameters.

Then, the HMM training unit 205 trains about the HMM using the acoustic feature parameters, the context information, and the pitch mark information (S302). The HMM includes the duration distribution based on the timing parameters and the output distribution of the pitch information. The trained HMM is stored in the HMM storing unit 106, and is used in speech synthesis.

Meanwhile, the functions of the speech synthesis model training device 200 either can be implemented using hardware or can be implemented using software executed by a CPU. For example, when the speech synthesis model training device 200 performs speech synthesis model training by executing a speech synthesis model training program, then the steps illustrated in FIG. 11 are executed by the CPU.

Meanwhile, regarding the HMM training unit 205, the explanation is given with reference to an example of performing maximum likelihood estimation of a speaker-dependent model using the corpus of a particular speaker. However, that is not the only possible case. Alternatively, for example, the HMM training unit 205 can have a different configuration in which a speaker adaptive technology, a model interpolation technology, or some other type of cluster adaptive training is used as a diverseness enhancement technology for the HMM speech synthesis. Still alternatively, it is possible to implement a different training method such as distribution parameter estimation using a deep neural network. That is, without treating the frame count as a parameter of the duration distribution in the speech analysis based on a fixed frame rate, the HMM training unit 205 can train a speech synthesis model using a model that has been trained according to an arbitrary method such as the pitch synchronous analysis in which the timing information is treated as a parameter of the duration distribution.

Figure 12:
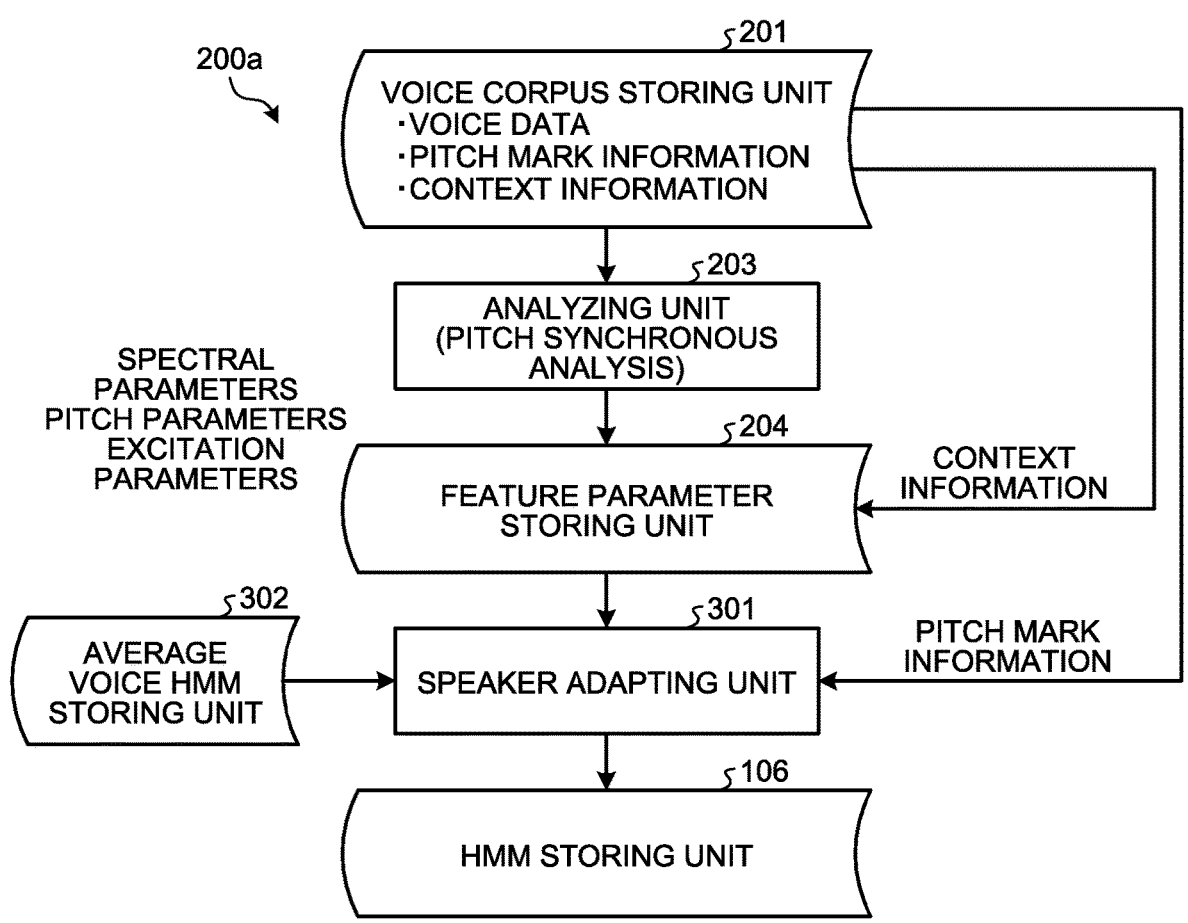
FIG. 12 is a block diagram illustrating a modification example of the speech synthesis model training device according to the embodiment.

Given below is the explanation of a modification example of the speech synthesis model training device 200. FIG. 12 is a block diagram illustrating a modification example (a speech synthesis model training device 200a) of the speech synthesis model training device 200. As illustrated in FIG. 12, the speech synthesis model training device 200a includes the speech corpus storing unit 201, the analyzing unit 203, the feature parameter storing unit 204, a speaker adaptation unit 301, an average voice HMM storing unit 302, and the HMM storing unit 106; and trains a speech synthesis model by performing speaker adaptation from the average voice. Meanwhile, the constituent elements that are practically same as the constituent elements described earlier are referred to by the same reference numerals.

The speaker adapting unit 301 applies a speaker adaptation technology with respect to an average speech model, which is stored in the average speech HMM storing unit 302, using the feature parameters stored in the feature parameter storing unit 204; and stores the obtained adaption HMM in the HMM storing unit 106.

The average speech HMM is a model of an average speech trained from a plurality of speakers, and has the features of the average speech. The speaker adapting unit 301 converts the average speech using the feature parameters of the target speaker and obtains an adaptation HMM. Moreover, the speaker adapting unit 301 can implement a speaker adaptation method such as maximum likelihood linear regression and, even when the target speaker data is small in volume and when there is insufficient context, can create a model in which the insufficient context is supplemented for the purpose of bringing the average speech HMM closer to the target speaker.

In the maximum likelihood linear regression, the mean vector is converted according to multiple regression analysis. For example, the speaker adapting unit 301 makes use of the embedded training based on the timing parameters given above in Equations 10 to 35, associates the training data and the average speech HMM, and obtains a regression matrix. Then, as a result of sharing the regression matrix among a plurality of distributions, it also becomes possible to convert the mean vectors of such distributions in which the corresponding training data is not present. Hence, as compared to a model trained using only a small amount of target data, a high-quality speech can be synthesized; and it becomes possible to perform speech synthesis from a model that is adapted to the speaker using the acoustic feature parameters based on the pitch synchronous analysis.

Figure 13:
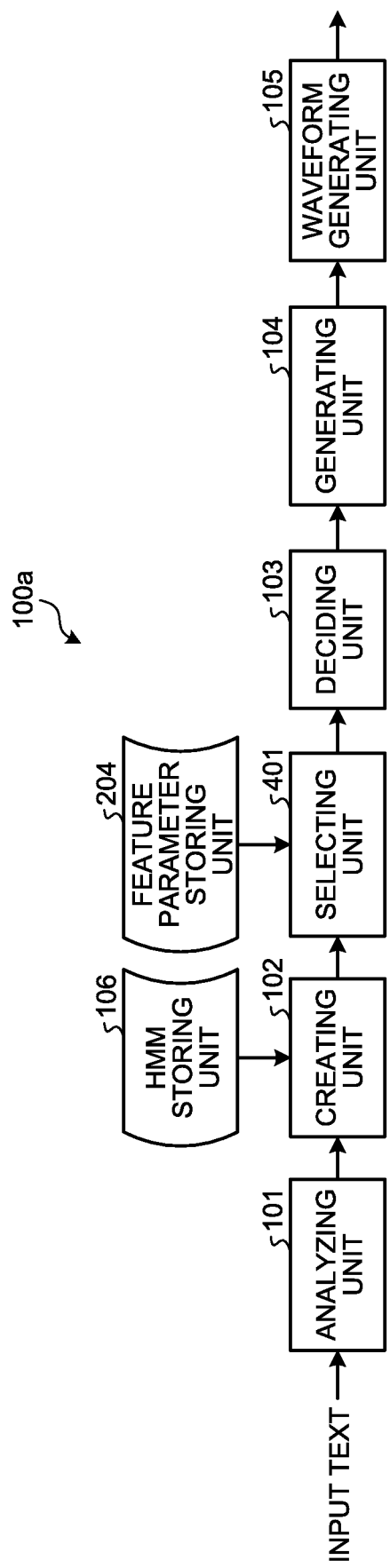
FIG. 13 is a block diagram illustrating a modification example of the speech synthesis device according to the embodiment.

Given below is the explanation of a modification example of the speech synthesis device 100. FIG. 13 is a block diagram illustrating a modification example (a speech synthesis device 100a) of the speech synthesis device 100. As illustrated in FIG. 13, the speech synthesis device 100a includes the analyzing unit 101, the creating unit 102, the deciding unit 103, the generating unit 104, the waveform generating unit 105, the HMM storing unit 106, the feature parameter storing unit 204, and a selecting unit 401; and performs speech synthesis based on feature parameter sequence selection. Meanwhile, the constituent elements that are practically same as the constituent elements described earlier are referred to by the same reference numerals. In the speech synthesis device 100a, in between the operations performed by the creating unit 102 and the operations performed by the deciding unit 103, the selecting unit 401 performs operations. More particularly, in the speech synthesis device 100a, with the HMM sequence obtained by the creating unit 102 serving as the target, the selecting unit 401 selects parameters from among the acoustic feature parameters stored in the feature parameter storing unit 204; and a speech waveform is synthesized from the selected parameters. That is, the selecting unit 401 selects, from among the candidates for acoustic feature parameters, the duration parameters corresponding to each state based on a statistical model and the acoustic feature parameters containing pitch information. In this way, when the selecting unit 401 selects parameters from among the acoustic feature parameters, it becomes possible to hold down the deterioration in the acoustic quality attributed to excessive smoothing of HMM speech analysis, and a natural synthesized speech that is closer to the actual speech can be obtained.

When the feature parameters based on the pitch synchronous analysis are used, the speech reproduced from the analysis parameters has the acoustic quality closer to the original speech as compared to the case in which the conventional feature parameters analyzed at a fixed frame rate are used. For that reason, in the speech synthesis device 100a, the effect of performing the pitch synchronous analysis is prominently visible, and the naturalness gets enhanced as compared to the case of using the conventional feature parameters.

Given below is the more detailed explanation of the selecting unit 401. Herein, the selecting unit 401 selects a feature parameter sequence based on the HMM. The unit of feature parameter selection is allowed to be an arbitrary unit. Herein, the feature parameters are selected for each state of the HMM sequence.

In the feature parameter storing unit 204, it is assumed that the feature parameters of the speech waveform are stored along with the information indicating that a boundary corresponding to the state is assigned. For example, the association of each state of the HMM with the speech waveform is obtained in advance according to the Viterbi alignment, and the time boundary of the obtained maximum likelihood transition sequence is stored as the boundary of the state in the feature parameter storing unit 204. In the case of using the target likelihood and the connection likelihood for selecting the feature parameters, the selecting unit 401 selects, with the states of the HMM sequence serving as the unit, an optimum feature parameter sequence according to dynamic programming.

Figure 14:
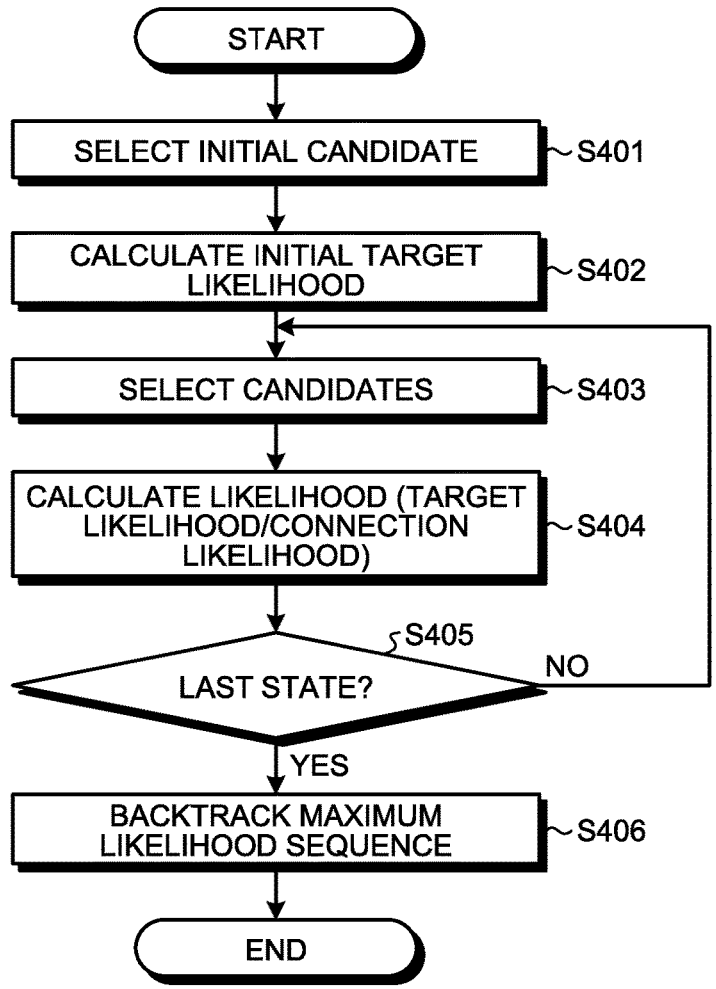
FIG. 14 is a flowchart for explaining the operations performed by a selecting unit.

FIG. 14 is a flowchart for explaining the operations performed by the selecting unit 401. Firstly, the selecting unit 401 selects candidate feature parameters in the initial state of the first HMM of the text to be synthesized (S401), and calculates the target likelihood with respect to each candidate in the initial state (S402). The target likelihood represents the digitized degree of matching with the target in the concerned section, and can be obtained from the likelihood of the distribution of the HMM sequence. In the case of using the logarithmic likelihood, it is calculated as the sum of the logarithmic likelihood of the feature parameters in each state section. The candidates for feature parameters represent a set of selectable feature parameters, and the training data used at the time of training the distribution of leaf nodes of the decision tree in the concerned state of the HMM can be treated as the candidates. Alternatively, the candidates can be decided according to some other method such as a method in which same phonemes corresponding to same states are treated as the candidates; or a method in which same phonemes narrowed down in a prosodic environment are treated as the candidates; or a method in which the candidates are decided according to the degree of correspondence of prosodic attributes.

Then, the selecting unit 401 advances the state number by one and selects the candidates with respect to each state (S403), and performs likelihood calculation including the calculation of the target likelihood and the connection likelihood (S404).

Meanwhile, in the case of the last state of the HMM, the next state implies the initial state of the subsequent HMM. The operation of candidate selection at S403 can be performed in an identical manner to the operation performed at S401. The connection likelihood represents the digitized degree at which the concerned section is suitable as the subsequent section of the preceding section. Regarding the connection likelihood, with respect to each candidate fragment in the preceding state section, the likelihood of selection of each candidate fragment in the concerned state is used; with reference to each candidate fragment in the previous state, the mean vector of the subsequent section is used as the mean vector; and the likelihood of the Gaussian distribution is calculated in which the variance of the output distribution of each state is used.

Then, in order to enable backtracking, the selecting unit 401 stores, for each candidate fragment, information about the most suitable candidate in the previous state. The selecting unit 401 determines whether or not the current state is the last state of the last HMM in the HMM sequence corresponding to the input text (S405). If the selecting unit 401 determines that the current state is the last state (Yes at S405), then the system control proceeds to the operation at S406. On the other hand, if it is determined that the current state is not the last state (No at S405), then the selecting unit 401 advances the state and the HMM by one, and the system control returns to the operation at S403.

Lastly, the selecting unit 401 selects the feature parameters having the highest likelihood, and sequentially backtracks the most suitable candidates in the preceding state and obtains a most suitable feature parameter sequence (S406). Then, the selecting unit 401 outputs the selected most suitable feature parameter to the deciding unit 103.

Figure 15:
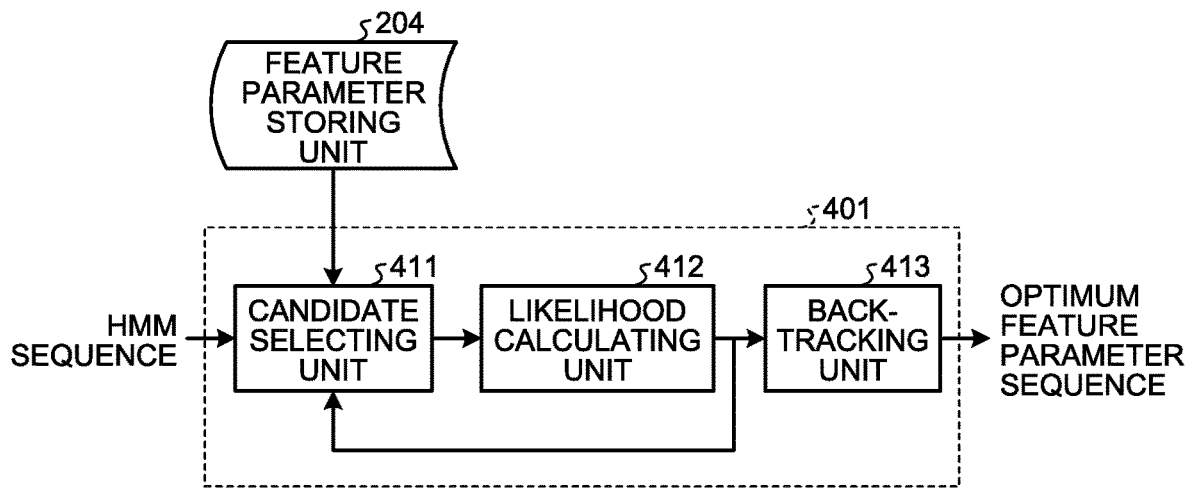
FIG. 15 is a diagram illustrating a specific configuration example of the selecting unit.

FIG. 15 is a diagram illustrating a specific configuration example of the selecting unit 401. For example, the selecting unit 401 includes a candidate selecting unit 411, a likelihood calculating unit 412, and a backtracking unit 413. The candidate selecting unit 411 selects candidates from the feature parameter storing unit 204. The likelihood calculating unit 412 calculates the target likelihood/connection likelihood. In the selecting unit 401, the candidate selecting unit 411 and the likelihood calculating unit 412 repeatedly perform the operations with the states of the HMM sequence serving as the unit, and lastly the backtracking unit 413 obtains the most suitable feature parameter sequence.

Meanwhile, although the explanation is given with reference to a likelihood maximization sequence, it is alternatively possible to implement an arbitrary method for selecting the feature parameters based on the HMM sequence. That is, a cost function that is calculated according to the inverse of the likelihood, the square error with the mean vector, and the Mahalanobis distance can be defined; and the feature parameters can be selected according to cost minimization. Alternatively, instead of selecting the feature parameters according to dynamic programming, the cost can be calculated only from the acoustic likelihood and the prosodic likelihood, and the feature parameters can be accordingly selected.

Still alternatively, the feature parameters can be generated from an HMM sequence; the cost can be calculated based on the distance from the generated parameters; and accordingly the feature parameters can be selected. When selecting the parameters, not only the most suitable parameter sequence can be selected but also a plurality of parameter sequences in each section can be selected, and averaged parameters can be used. As a result of such operations, the selecting unit 401 can select the most suitable parameters with respect to each state of each HMM in the input HMM sequence, and then outputs the relevant information to the deciding unit 103.

The deciding unit 103 decides the pitch-cycle waveform count from the selected duration distribution sequence and the pitch feature parameter sequence. The generating unit 104 updates the distribution using the selected feature parameters. Using the variance of the HMM sequence, the distribution can be updated by substituting the mean vector of the distribution with the selected feature parameters, and parameters can be generated from the updated distribution sequence so that parameters having the selected feature parameters reflected therein can be generated. The waveform generating unit 105 generates a synthesized speech from the generated parameters. In this way, as a result of including the selecting unit 401, the speech synthesis device 100a becomes able to generate a waveform according to the acoustic feature selected in each section, and to obtain a natural synthesized speech.

Meanwhile, the speech synthesis device 100, the speech synthesis device 100a, the speech synthesis model training device 200, as well as the speech synthesis model training device 200a can be implemented using a general-purpose computer device as the basic hardware. That is, the speech synthesis device as well as the speech synthesis model training device can be implemented by making a processor installed in a computer device execute programs. The programs (the speech synthesis program or the speech synthesis model training program) executed in the speech synthesis device 100, the speech synthesis device 100a, the speech synthesis model training device 200, and the speech synthesis model training device 200a are stored in advance in a ROM.

Alternatively, the programs executed in the speech synthesis device 100, the speech synthesis device 100a, the speech synthesis model training device 200, and the speech synthesis model training device 200a can be recorded as installable or executable files in a computer-readable recording medium such as a CD-ROM (Compact Disk Read Only Memory), a CD-R (Compact Disk Readable), or a DVD (Digital Versatile Disk); and can be provided as a computer program product. Still alternatively, the programs can be stored in a downloadable manner in a computer connected to a network such as the Internet.

In this way, in the speech synthesis device according to the embodiment, using the duration that is based on the duration distribution of each state of each statistical model in a statistical model sequence and using pitch information that is based on the output distribution of pitch feature parameters, the pitch-cycle waveform count of each state is decided; a distribution sequence of acoustic feature parameters is generated based on the decided pitch-cycle waveform count; and acoustic feature parameters are generated based on the generated distribution sequence. Hence, it becomes possible to prevent the deterioration in the acoustic quality and to prevent an unnatural phoneme duration. Moreover, in the speech synthesis device according to the embodiment, while using the precise acoustic feature parameters based on the pitch synchronous analysis, the duration calculated as the duration distribution from the pitch marks is modeled; and, at the time of synthesis, the pitch-cycle waveform count is calculated based on the pitch information which is generated based on the output distribution of the duration distribution parameters and the output distribution of the pitch feature parameters of the concerned state, and speech synthesis can be performed. Hence, in the speech synthesis device according to the embodiment, the problem of an unnatural phoneme duration attributed to a mismatch in the pitch at the time of training and the pitch at the time of synthesis can be resolved while still using precise speech analysis, and a high-quality speech synthesis can be performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A speech synthesis model training device comprising: one or more hardware processors configured to perform: storing speech data, and pitch mark information and context information of the speech data; and from the speech data, analyzing acoustic feature parameters at each pitch mark timing in the pitch mark information; and from the acoustic feature parameters analyzed, training a statistical model which has a plurality of states and which includes an output distribution of acoustic feature parameters including pitch feature parameters and a duration distribution based on timing parameters.

2. The speech synthesis model training device according to claim 1, wherein the one or more hardware processors use the context information of the speech data, use the acoustic feature parameters at each pitch mark timing, use pitch mark timing information, and train a duration distribution by referring to the pitch mark timing information.

3. The speech synthesis model training device according to claim 1, wherein the one or more hardware processors use, as the statistical model, Hidden Semi-Markov Model in which self-transition probability is expressed as a state duration distribution, obtain, from pitch mark timing at a start point and pitch mark timing at an end point in each state, a duration based on timing parameters present in each state, and set the distribution of presence durations as the state duration distribution.

4. The speech synthesis model training device according to claim 1, wherein the one or more hardware processors estimate an output distribution of each state using the state duration distribution and estimate model parameters including the output distribution of each state of the statistical model.

5. The speech synthesis model training device according to claim 1, wherein the acoustic feature parameters are configured using pitch feature parameters, spectral feature parameters, and excitation feature parameters at each pitch mark timing of speech data, and include phase feature parameters as excitation feature parameters.

6. A speech synthesis model training method implemented by a computer, the method comprising:

storing, in a memory unit, speech data, and pitch mark information and context information of the speech data;

analyzing, from the speech data, acoustic feature parameters at each pitch mark timing in pitch mark information; and training, from the analyzed acoustic feature parameters, a statistical model which has a plurality of states and which includes an output distribution of acoustic feature parameters including pitch feature parameters and a duration distribution based on timing parameters.

7. A computer program product comprising a non-transitory computer-readable medium including a speech synthesis model training program that causes a computer to execute:

storing, in a memory unit, speech data, and pitch mark information and context information of the speech data;

analyzing, from the speech data, acoustic feature parameters at each pitch mark timing in pitch mark information; and training, from the analyzed acoustic feature parameters, a statistical model which has a plurality of states and which includes an output distribution of acoustic feature parameters including pitch feature parameters and a duration distribution based on timing parameters.

* * * * *